United States Patent [19]

Brandes et al.

[11] 3,997,392

[45] Dec. 14, 1976

[54] CONTROL ROD ARRANGEMENT FOR GAS-COOLED NUCLEAR REACTOR

[75] Inventors: Siegfried Brandes, Schriesheim; Arnulf Huebner, Lampertheim, both of Germany

[73] Assignee: Hochtemperatur-Reactorbau GmbH, Cologne, Germany

[22] Filed: Oct. 31, 1975

[21] Appl. No.: 627,745

[30]   Foreign Application Priority Data

Oct. 31, 1974   Germany .......................... 2451749

[52] U.S. Cl. ............................................. 176/36 R
[51] Int. Cl.² ......................................... G21C 7/08
[58] Field of Search .................. 176/17, 18, 33, 34, 176/35, 36, 41, 58, 58 PB, 86, 87

[56]         References Cited
         UNITED STATES PATENTS 3,048,534   8/1962   Tonks ................................... 176/58
3,123,532   3/1964   Michel ............................. 176/36 R Primary Examiner—Samuel Feinberg
Attorney, Agent, or Firm—Bacon & Thomas

[57]              ABSTRACT

The core pile of a gas-cooled nuclear reactor is controlled by a plurality of absorbent graphite rods that are inserted into the pile according to a pre-determined pattern, the pattern being such that the density of distribution of the control rods over the cross-sectional area of the core pile is radially increased in the direction of the core periphery. By this control rod arrangement an overly severe concentration in the flow of neutrons on the periphery of the cord pile is avoided, and a more even distribution of neutron flow across the diameter of the reactor is obtained.

8 Claims, 5 Drawing Figures

CONTROL ROD ARRANGEMENT FOR GAS-COOLED NUCLEAR REACTOR

BACKGROUND OF THE INVENTION

1. Field of the Invention

The present invention relates generally to control rod arrangements for nuclear reactors, particularly nuclear reactors of the gas-cooled type having a core pile made up of spherical fissionable fuel elements encased in a reflector chamber. More particularly, it relates to a new distribution arrangement of the control rods in the core pile of such a reactor, whereby a more even distribution flow of neutrons across the diameter of the reactor is obtained, and an overly severe concentration in the flow of neutrons on the periphery of the core is avoided.

2. Description of the Prior Art

There have been several different approaches taken to the design of nuclear reactors. The present invention relates generally to nuclear reactors of the gas-cooled type, wherein the core pile is encased in a reflector chamber consisting of a ceiling dome, a cylindrical wall, and a floor, and into which chamber control rods for the core pile may be introduced for the control and fine adjustment of the reactor. In the present invention the core pile is made up of spherical fissionable fuel elements, the structure thus far described being known to the art.

It is customary to use absorbent graphite rods for the control and fine adjustment of such a nuclear reactor. Depending upon the depth of penetration of the control rods into the core pile, the absorbent graphite will either increase or diminish the the flow of neutrons, and consequently the power output of the core. It is also a known fact that in single-core construction the radial flow of neutrons follows a Bessel function, while the axial flow follows a cosine function.

In general, the object in such a nuclear reactor is to attain a constant and even flow of power output, which depends upon the profile of the neutron flow and the locally varying density of fissionable material. In commercial reactors, various methods are applied to attain an even power output in the radial direction and at the same time attain a maximum output from any given volume of the core pile, while maintaining a certain maximum temperature of the core elements. One of the present methods applied for equalizing the output lies in the designing of the reactor core in such a manner that it is divided into an inner and an outer core, the inner core being of a lesser density of fissionable fuel than the outer.

The absorption or control rods are also utilized to attain an even spherical distribution of output. In commercial reactors the absorption rods are generally distributed evenly over the core in a predetermined pattern, permitting the introduction of rods as may be required, in a variety of central or external positions. Furthermore, it is favorable if the rods can be moved to a position close to the bottom reflector of the reactor structure based upon the premise that an efficient distribution of the neutron flow can be attained only if the control rods are completely immersed.

In the invention described in German Auslegeschrift No. 1,049,986, it was further determined that evenness and and uniformity in the neutron flow can be attained with particular efficiency if the length of the absorbing damper or control rods is approximately proportional to the thermal flow of neutrons. An expecially even distribution of neutron flow results from following this approach.

The statements thus far made regarding the general performance of the reactor apply under normal, conventional methods of control and fine adjustment. Computer-derived projections, however, show that when absorption or control rods are introduced at their full length in the core of a gas-cooled reactor moderated by graphite, an excessive concentration of thermal flow of neutrons will occur on the periphery of the core, as well as on the lateral reflector of the reactor structure. The radial distribution of neutron flow is thereby proven to be unfavorable.

There is thus a need for controlling neutron flow at the periphery of a reactor core, and to assure an even distribution of neutron flow across the core. The control rod arrangement of the present invention is intended to satisfy that need.

SUMMARY OF THE INVENTION

It is the principle object of the present invention to provide an improved arrangement of control rods for a nuclear reactor, whereby an evenly distributed flow of neutrons across the diameter of the reactor pile is obtained.

Another object of the invention is to provide an improved arrangement of control rods for a nuclear reactor, whereby excessive neutron flow at the perimeter of the core pile is prevented.

Yet another object is to provide a control rod arrangement of the type described, especially adapted for use with gas-cooled nuclear reactors of the kind utilizing spherical fuel elements.

A further object is to provide a concept for arranging the control rods in the core of a nuclear reactor, to obtain a desired pattern of neutron flow, and improve the safety of this reactor.

In a gas-cooled nuclear reactor of the general type described earlier, when the control rod arrangement of the present invention is utilized an overly severe concentration in the flow of neutrons on the periphery of the core pile and on the reflector of the reactor structure is prevented, even though the absorption or control rods are fully immersed, while the reactor is turned off. At the same time, an evenly distributed flow of neutrons across the diameter of the reactor is obtained. This is accomplished in the present invention by increasing the distribution density of absorption of control rods per square unit of core surface radially from the center of the core to the periphery thereof.

By increasing the distribution density of the control rods over the area is meant increasing the number of absorption or control rods installed per square unit of cross-sectional area in the core pile. The number of absorption or control rods installed over a square meter of core diameter is in direct proportion to the distribution density. In order to also attain the intended even profile of the radial flow of neutrons when the reactor is in a completely shut-off condition, it is proposed by the invention that the number of absorption rods be increased along the outer periphery of the core near the lateral reflector of the reactor structure, and that the number be decreased in the zone near the center of the core.

Understandably, the distribution density cannot be selected at random, for various reasons. In currently existing reactors of the general type described, a mean density of distribution will consist approximately of two rods per square meter, with the effective diameter of a rod measuring between 8 to 10 cm. The distance between different core rods is determined by requirements of operability, by the reflecting potential of the core, and by considerations connected with the overall design and construction of the plant.

In the past, the distribution pattern for absorption or control rods was such that the distances between the several rods were equal. To attain the appropriate distribution of rods according to the present invention, a mean density of distribution can be established and applied to an area of approximately one half of the core radius. In orientation to this mean distance, the density pattern is altered both ways, towards the center of the core, and away from it towards the outer edge of the core. The density pattern is diminished in the direction of the core center, and is increased radially away from the mean distance towards the outer edge of the core. The distribution of the absorption or control rods as described will result in the prevention of an excessive surge in the flow of neutrons while all the rods are fully inserted, and it will maintain the radial flow of neutrons at a relatively even level.

An increase in the density of the rod distribution radially away from the center of the core can be attained by progressively condensing the grid pattern by which the rods are arranged. As the radial distance from the core center is increased, the number of absorption or control rods covering the area over the core is increased in proportion. As an alternative measure, an increase in distribution density can be attained through a reduction in the distances at which the absorption rods are spaced relative to each other. This can be accomplished by installing additional control rods in the circular pattern, or by eliminating a number of rods from the inner ring pattern and replacing them in the outer rings. An increase in the density of distribution through a reduction in the distances between rings of absorption rods can be attained either simultaneously, or by a separate operation.

In order to minimize the surge of neutron flow within the reactor, it is necessary that the absorption or control rods be positioned as closely to the outer periphery of the core pile, and hence the lateral reflector wall of the reactor structure, as considerations pertaining to structural stability and material solidity will permit. In reactors equipped with block-shaped fuel elements this objective can be attained without difficulty. In such reactors it is possible to install the absorption rods directly adjacent to the reflector's lateral wall. But in reactors equipped with a core pile of spherical fuel elements, it is necessary that a certain minimal distance between the immersed absorption or control rods and the wall of the reflector be maintained. This minimal distance usually measures between 40 cm and 60 cm.

In a reactor fuelled by spherical elements, greater efficiency is attained if the core is made up of several radially concentric zones. In such a design the zones are provided with fuel elements of different fissionable potency, the fissionable material used in the fuel elements installed in the outermost zone being of lesser potency than that of the elements installed in the inner zone. Occasionally elements are used in the outermost ring that possess merely reflecting qualities, and in reactors of this type the outermost absorption of control rods are installed in an area located between the outermost and the adjacent inner zones. With such a design, the rods can be inserted directly over the excessive build-up of neutron flow when the reactor is turned off.

Other objects and many of the attendant advantages of the present invention will become readily apparent from the following description of the preferred embodiments, when taken in conjunction with the accompnying drawings.

DESCRIPTION OF THE PREFERRED EMBODIMENTS

Figure 1:
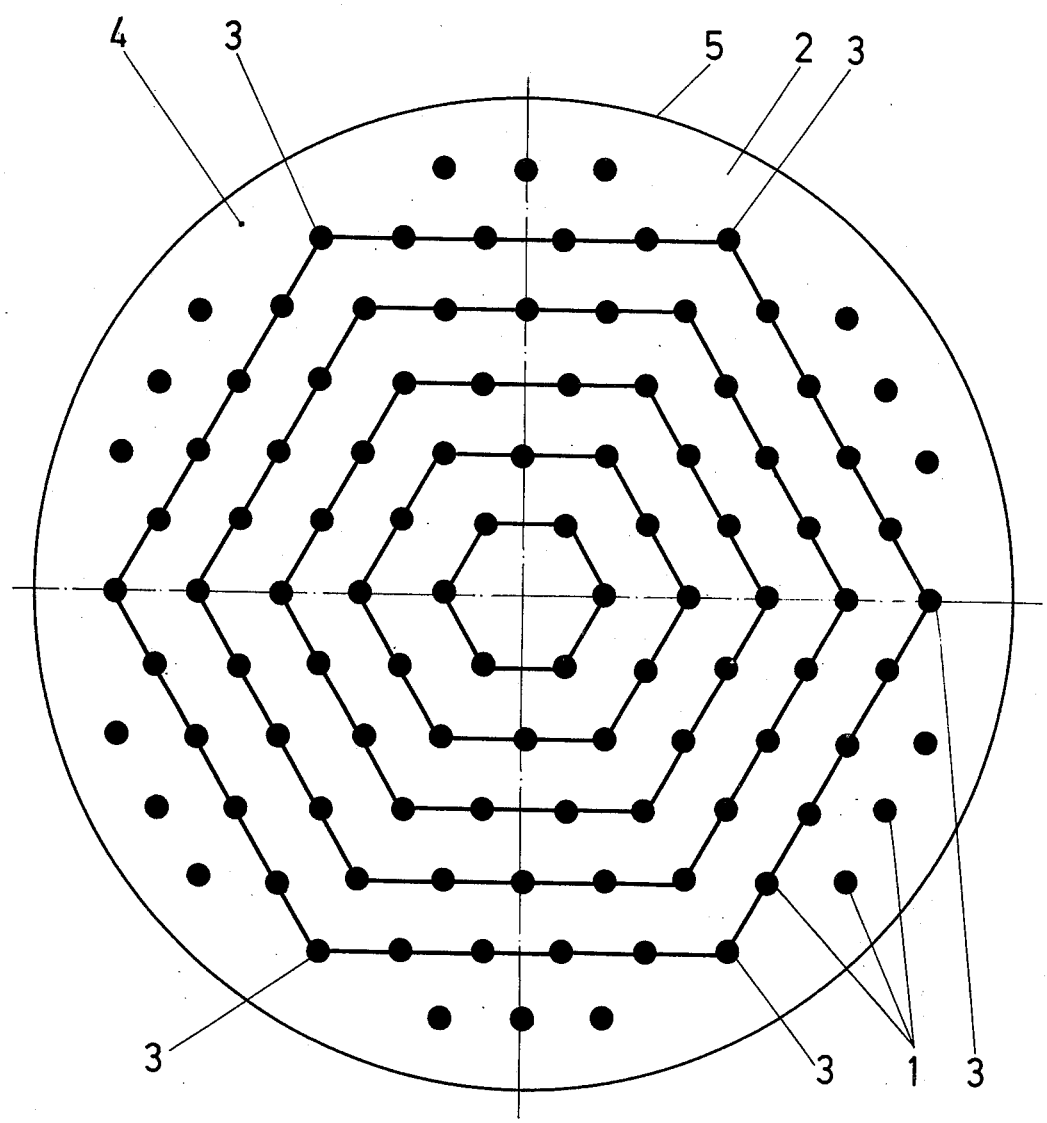
FIG. 1 is a schematic horizontal sectional view of a typical core for a gas-cooled nuclear reactor, the surrounding structural elements of the reactor not being shown for purposes of clarity, and showing a conventional geometric arrangement for the control rod elements.

Referring now to FIG. 1, a conventional layout for a plurality of absorption control rods 1 over the cross-section surface 2 of a core pile 4 is shown. The core pile 4 is itself part of a conventional gas-cooled, spherical fuel element reactor moderated with graphite absorption or control rods. Since the structure of such a reactor is known to the art, such is not shown herein so that the core and the arrangement for the control rods according to the invention can be more clearly perceived. However, it will be understood that the core pile 4 is encased in a lateral reflector structure (not shown), with the interior periphery of the reflector and the outer periphery of the core being indicated by the circular line 5.

Figure 4:
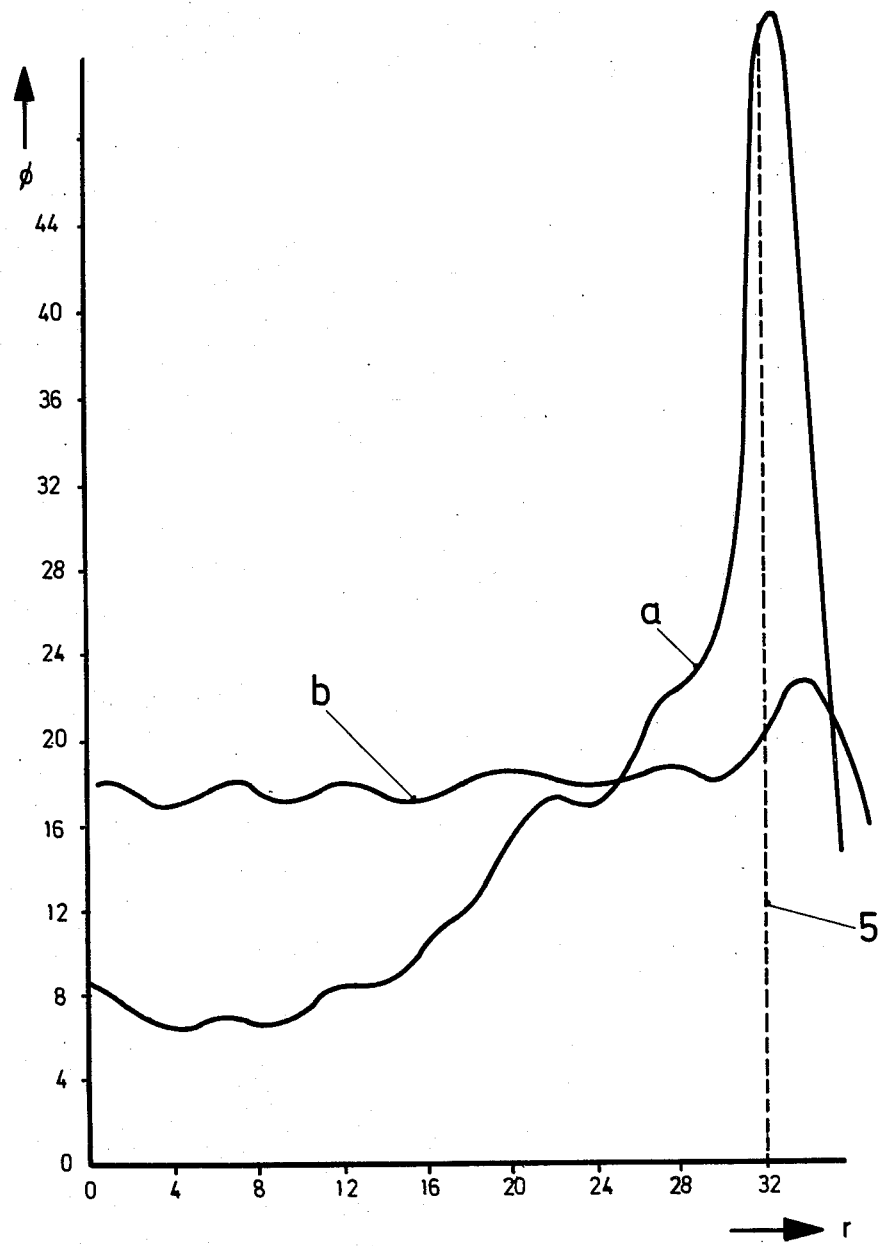
FIG. 4 is a graph depicting the radial flow of neutrons while the reactors of FIGS. 1 and 3 are in a shut-off condition, the curve a relating to the conventional control rod arrangement of FIG. 1, and the curve b relating to the control rod arrangement of FIG. 3.

During operation of the reactor, the control rods 1 are mostly moved or withdrawn to an outward position, while a number thereof are maintained positioned in the core to afford compensation for excess reactivity necessary for the operation of the nuclear plant, and to even out the distribution of the radial outflow of neutrons. Eventually all of the rods 1 are moved out after the core pile has acquired radial zoning of the breeder medium itself. When the reactor is entirely shut off, that is, after all the absorbing or control rods 1 have been fully inserted into the core, a neutron flow will result within the core in accordance with curve a of FIG. 4, assuming that the rods 1 are arranged to form a symmetrical pattern like that shown in FIG. 1. The curve of a FIG. 4 shows clearly that the neutron flow of the core of FIG. 1 is more efficiently shut-off at the center than it is at the periphery.

With respect to FIG. 1, it is evident from the drawings that the control rods 1 are evenly arranged about the peripheries of a plurality of evenly spaced, concentric hexagonal rings, with the addition of three control rods positioned centrally of and along an axis parallel to each of the six sides of the outermost hexagon. In fact, the control rods of FIG. 1 all are arranged to form equilateral triangles. The even spacing pattern of FIG. 1 is the conventional arrangement for the absorption or control rods 1.

If the absorption or control rods of the nuclear reactor are re-positioned in accordance with the invention, the flow of neutrons will level or even off radially when the reactor is in a shut-off condition. This is illustrated by the curve b in FIG. 4, and under such a levelling off there is an increase in the overall efficiency of the total shut-off effect of the system of absorption or control rods.

The core pile arrangement of FIG. 1 further includes maximal or primary absorption rods 3, which is the term used for the rod or rods removed from the core first, and which thereby produce a maximal effect, i.e., a maximal surge in the multiplication factor of the reactor's output. When the rod arrangement of the invention is employed, the effective strength of the maximal or primary absorption rod can be reduced, which is most desirable. This fact is of particular importance in the computation of safety factors when the reactor is in a switched-off condition. The computation is based on the total effectiveness of the entire system of absorption rods, minus the absorption capacity of the maximally effectual absorption rod 3. In this manner, the shut-off effect on which the computation of safety factors is based can be further increased.

The augmentation of the shut-off effect provided by the invention adds to the safety of the reactor. If no additional safety measures are required, the invention can be used to reduce the number of absorption rods 1 in the core without affecting the shut-off capability of the system. This can be attained by raising the mean capacity of the control rods 1 through improvement in the distribution of the system of absorption or control rods 1 over the radius of the core, and possibly through a reduction of the maximal efficiency of one rod 3. The maximal efficiency may be reduced, even though the mean efficiency may be increased on each rod.

Figure 2:
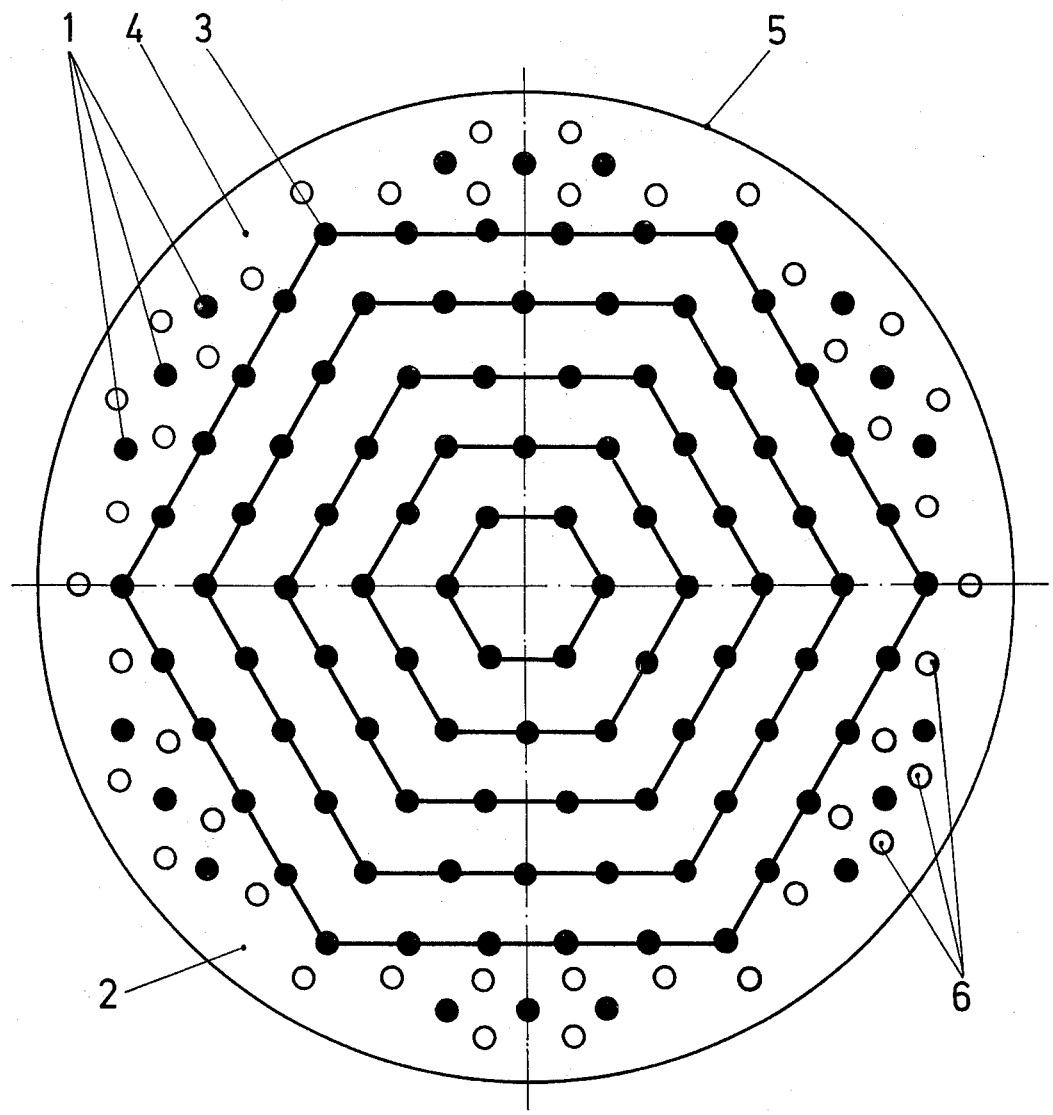
FIG. 2 is a schematic horizontal sectional view similar to FIG. 1, but with the control rods of the core pile arranged according to a first embodiment of the invention.

Referring now to FIG. 2, a first embodiment of a control rod arrangement according to the invention is illustrated. In FIG. 2 the rods 1 of FIG. 1 are retained, and are positioned as shown in FIG. 1. But in addition thereto additional absorption or control rods 6, indicated by open circles to contrast with the dots that indicate the control rods 1, have been placed outside the outermost hexagonal ring of control rods 1, and around the three control rods 1 disposed outwardly of each side of the outermost hexagonal ring. More specifically, the majority of the additional control rods 6 are also arranged to define a hexagonal ring, and such ring is spaced from and is disposed concentrically of the outermost hexagonal ring of control rods 1. However, the spacing between the hexagonal ring of control rods 6 and the outermost ring of control rods 1 is half that between the concentric rings of control rods 1. The balance of the additional control rods 6 are disposed as pairs, outwardly of the sets of three control rods 1 near the periphery 5 of the core 4. The balance of the additional control rods 6 are disposed as pairs, outwardly of the sets of three control rods 1 near the periphery 5 of the core 4. The result is an obviously increased density of control rods 1 and 6 at the periphery of the pile core 4.

Figure 3:
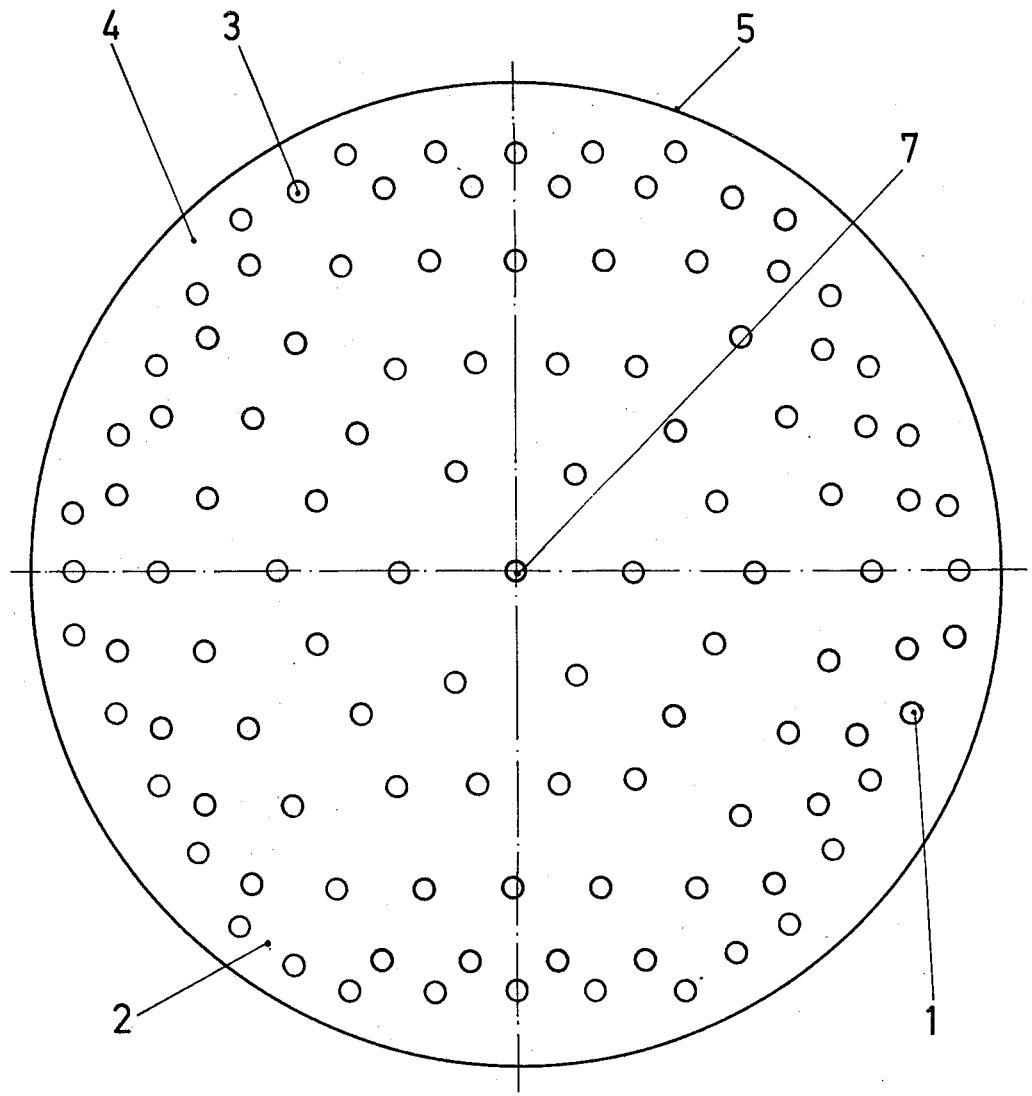
FIG. 3 is a schematic horizontal sectional view similar to FIG. 1, but with the control rods of the core pile arranged according to a second embodiment of the invention.

Turning now to FIG. 3, such shows another embodiment of the arrangement of the invention, wherein the center of the core 4 contains a relatively small number of control rods 1 per unit of surface area, as compared to the greater density of distribution near the perimeter of the core 4 of FIG. 3, and as compared to the central portion of the core 4 of FIG. 2. In FIG. 3 all of the control rods are shown as open circles, and the greatest percentages thereof are arranged in one of four concentric hexagonal rings.

In contrast to FIG. 2, the inner hexagonal ring in FIG. 3 is spaced farther from the center of the core 4 therein than is the inner hexagonal ring of FIG. 2. Moreover, the inner three hexagonal rings of FIG. 3 are spaced farther apart from each other than are the inner five hexagonal rings of FIG. 2. The result is the described lower density of distribution of control rods 1 near the center of the arrangement in FIG. 3. It should be noted that in FIG. 3 a center control rod 7 is also provided.

The outermost hexagonal ring of control rods 1 in FIG. 3 is positioned like the ring of additional control rods 6 in FIG. 2, close to the periphery 5 of the reactor pile 4. Five additional control rods 1 are disposed in evenly spaced alignment parallel to each side of the outermost hexagonal ring of control rods 1 in FIG. 3, and serve to further increase the density of control rods at the perimeter of the core 4.

Generally speaking, it is evident from both FIG. 3 and FIG. 4 that the concept of the invention is to place the control rods in a pattern of radially decreasing grid spacing, moving outwardly from the center of the core pile 4, with the density of control rods for a unit of area increasing moving radially outwardly toward the perimeter.

Referring now to FIG. 4, such shows the typical flow pattern of thermal neutrons as a function of the core radius r, for the reactors of FIGS. 1 and 3. In a core designed in accordance with the conventional pattern of distribution of control rods 1 as shown in FIG. 1, the flow of neutrons following the shut-down of the reactor proceeds approximately in accordance with a curve a. At the core center the flow is relatively weak. It rises moving radially towards the periphery 5, and increases sharply near said periphery. It then drops again at the periphery, which is also where the reflector of the reactor apparatus is located. In contrast, the flow pattern of neutrons in a configuration of absorption rods 1 according to FIG. 3 is represented by the curve b in FIG. 4, which follows a moderately level path, with only a minor rise in intensity occuring near the reflector.

Figure 5:
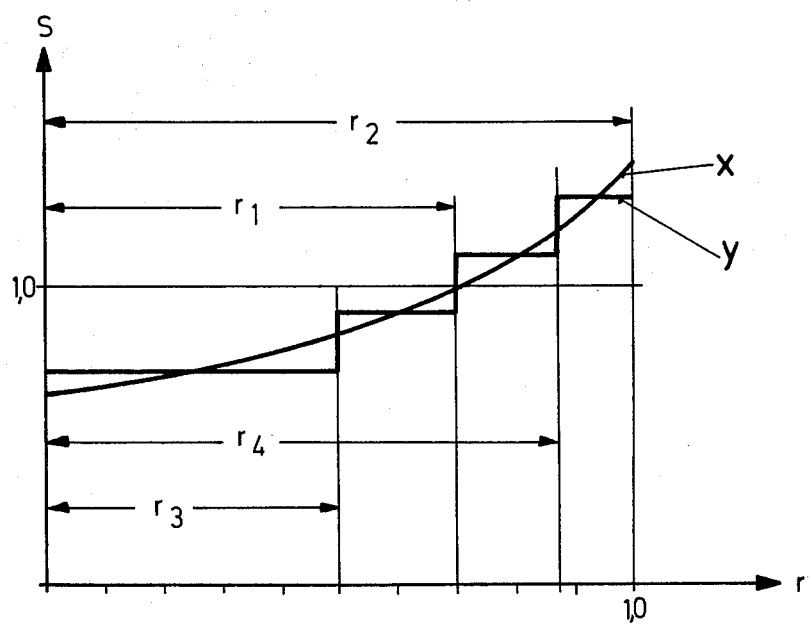
FIG. 5 is a graph showing the results on neutron flow of an advantageous distribution of the control rods in relative proximity, and the dependence upon the relative length of the core radius.

Turning to FIG. 5, such shows the result of a favorable distribution of relative distribution densities S as a function of the relative core radius r. Curve $x$ in FIG. 5 results from the continuous distribution of control rods over the cross section of the core. Curve $y$ shows the pattern of distribution densities S in a discontinuous distribution of rods. In either case, the desnity of distribution S increases radially from the center of the core. It is of advantage to determine the point of intersection of the curves $x$ and $y$, having a density of distribution where $S=10$, in such a manner that the fields defined by the circular or ring-shaped areas of the core having the radius $r_1$ and $r_2 - r_1$, respectively, are approximately of equal size.

Particularly favorable results can be obtained if in a discontinuous distribution of control rods the rings of control rods are installed on radii $r_3$, $r_1$ and $r_4$. Such a design divides the total area of the core cross-section into circular, or annular shaped areas of equal size. The circular area covered by $r_3$ approximately equals the annular shaped area covered by $r_1 - r_3$, $r_4 - r_1$, or $r_2 - r_4$. By zoning the core surface radially through fuel elements of varying content of fissionable material, it is possible to place the rings of absorption or control rods directly over the outline of each zone. A preferred arrangement is to have each zone with progressively less fissionable material, moving radially outward from the center of the core, with a control rod ring at each border between zones.

EXAMPLES

In a ball-pile reactor of 1,000 MWe, having a core radius of 400 cm, the following patterns of distribution of absorption or control rods serve to illustrate the differences between the conventional control rod arrangement pattern of FIG. 1, and the arrangement concept of the invention:

EXAMPLE 1

The control rods are positioned as in FIG. 1, wherein such form a grid pattern of equilateral triangles. Assuming 108 control rods are used, the following results can be obtained:

| | |
|---|---|
| Efficiency of the system | 25% k |
| Maximal efficiency of rods | 3% k |
| Efficiency applicable after safety analysis | 22% k |

EXAMPLE 2

The control rods are positioned according to the invention as shown in FIG. 3, with the density of distribution of control rods increasing radially from the core. Assuming again that 108 control rods are used, the following results can be obtained:

| | |
|---|---|
| Efficiency of the system | 27% k |
| Maximal efficiency of rods | 2% k |
| Efficiency applicable after safety analysis | 25% k |

EXAMPLE 3

The control rods are again positioned according to the teachings of the invention, but with a reduction in the number of rods to approximately 90, while maintaining full efficiency and an identical safety factor. In this instance the following results can be obtained:

| | |
|---|---|
| Efficiency of the system | 24% k |
| Maximal efficiency of rods | 2% k |
| Efficiency applicable after safety analysis | 22% k |

Obviously, many modifications and variations of the invention are possible.

What is claimed is:

1. In a nuclear reactor including a core pile of fissionable fuel elements, and a plurality of control rods introduceable into said core pile for the control and adjustment of the nuclear reactor, said control rods being arranged so that the density of distribution thereof per unit of cross-sectional surface area of the core pile increases radially from the center of the core pile toward the periphery thereof.

2. The nuclear reactor as recited in claim 1, wherein the control rods are arranged to define a grid, and wherein the density of distribution of the control rods is increased by decreasing the spacing between the rods and the grid formed thereby, moving outwardly radially from the center of the core pile.

3. The nuclear reactor as recited in claim 1, wherein the control rods are generally arranged in a plurality of generally concentric rings, and wherein the density of distribution of the control rods is increased by decreasing the spacing between the radially outer rods.

4. The nuclear reactor as recited in claim 1, wherein the control rods are arranged in a plurality of generally concentric rings, and wherein the density of distribution of the control rods is increased by spacing radially outer concentric rings closer than radially inner concentric rings.

5. The nuclear reactor as recited in claim 1, wherein the core is divided into concentric corss-sectional areas, the control rods being positioned between the borders of the concentric cross-sectional areas.

6. The nuclear reactor as recited in claim 5, wherein the fissionable material content of the core is progressively less in each concentric cross-sectional area, moving radially outwardly from the center of the core.

7. The nuclear reactor as recited in claim 5, wherein the concentric cross-sectional areas are generally of the same size.

8. In a nuclear reactor of the gas-cooled type comprising a core pile made up of spherical fissionable fuel elements encased in a reflector vessel having a ceiling dome, a cylindrical wall, and a floor, and a plurality of absorbent graphite rods introduceable into the vessel for controlling the nuclear reactor, the improvement comprising said rods being arranged so that the density of distribution thereof over the cross-sectional surface area of the core pile increases radially from the center of the core pile toward the periphery thereof at said cylindrical wall of said reflector vessel, whereby the flow of neutrons is relatively even across the radius of said core pile.

* * * * *